US006707784B2

(12) United States Patent
Sako et al.

(10) Patent No.: US 6,707,784 B2
(45) Date of Patent: Mar. 16, 2004

(54) OPTICAL STORAGE MEDIUM HAVING TWO RECORDING AREAS OF DIFFERENT FORMATS

(75) Inventors: Yoichiro Sako, Tokyo (JP); Tatsuya Inokuchi, Kanagawa (JP); Katsumi Toyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 297 days.

(21) Appl. No.: 09/935,314

(22) Filed: Aug. 22, 2001

(65) Prior Publication Data

US 2002/0051409 A1 May 2, 2002

(30) Foreign Application Priority Data

Aug. 28, 2000 (JP) .................................. P2000-257996

(51) Int. Cl.7 ................................................. G11B 7/24
(52) U.S. Cl. .................................. 369/275.3; 369/59.25
(58) Field of Search ........................... 369/275.3, 275.2, 369/280, 47.1, 47.15, 47.23, 47.24, 47.31, 47.47, 44.26, 53.2, 53.41, 59.25, 59.23

(56) References Cited

U.S. PATENT DOCUMENTS

| | | | | |
|---|---|---|---|---|
| 5,241,531 A | * | 8/1993 | Ohno et al. ............... | 369/275.2 |
| 5,684,785 A | * | 11/1997 | Itami et al. .............. | 369/275.2 |
| 5,812,519 A | * | 9/1998 | Kawamura et al. ...... | 369/275.1 |
| 6,031,808 A | * | 2/2000 | Ueno ........................ | 369/111 |
| 6,038,208 A | * | 3/2000 | Shikunami et al. ...... | 369/275.3 |
| 6,078,559 A | * | 6/2000 | Takemura et al. ........ | 369/275.3 |
| 6,229,784 B1 | * | 5/2001 | Yoshimoto et al. ...... | 369/275.3 |
| 6,310,854 B1 | * | 10/2001 | Sato et al. ............... | 369/275.3 |
| 6,580,684 B2 | * | 6/2003 | Miyake et al. ........... | 369/275.3 |

* cited by examiner

*Primary Examiner*—Tan Dinh
(74) *Attorney, Agent, or Firm*—Jay H. Maioli

(57) ABSTRACT

Data in CD signal format is recorded to a first portion of an optical disc and compressed digital data in CD-ROM format in double density is recorded to a second portion of the disc, with a blank gap between the first and second portions. Addresses of the first portion are represented in a notation of minute, second, and frame and addresses of the second portion are represented in binary notation. When assigning addresses it is determined whether the first portion is accessed, and when the first portion is accessed the generation of normal addresses is started. When the determined result represents that the first portion is not accessed, the gap length is calculated and the start address of the second session is generated based upon the end address of the first portion and the known gap length. It is then determined whether the second portion has ended. Unless the second portion ends, the generation of the second addresses is continued. When the second portion ends, the generation of addresses is stopped.

10 Claims, 11 Drawing Sheets

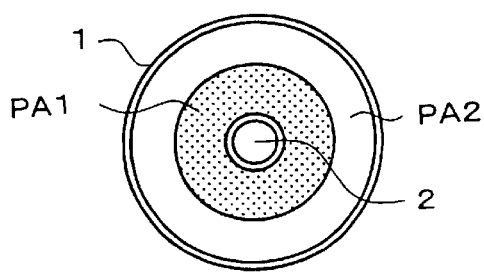
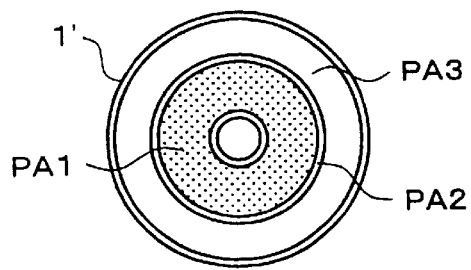
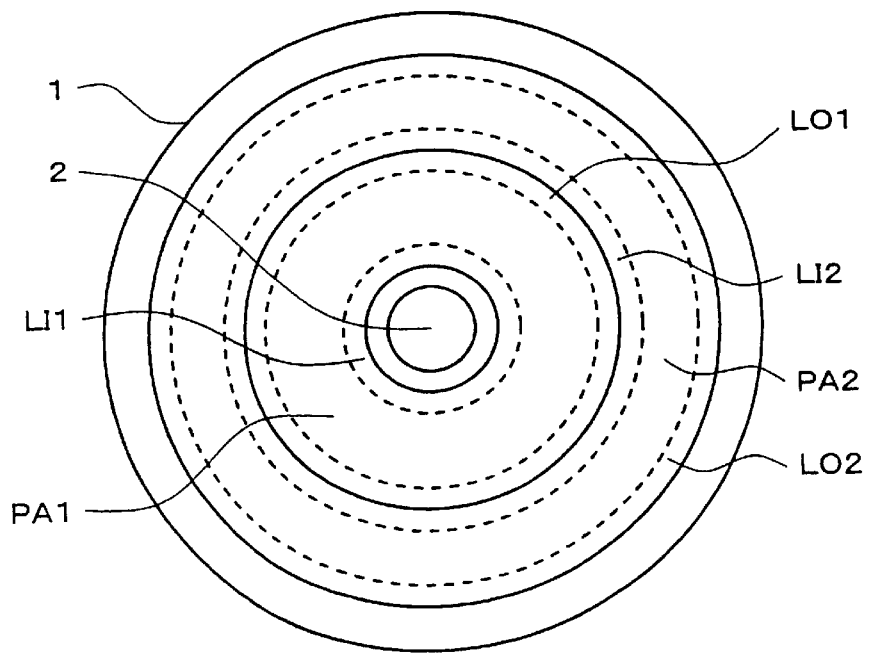

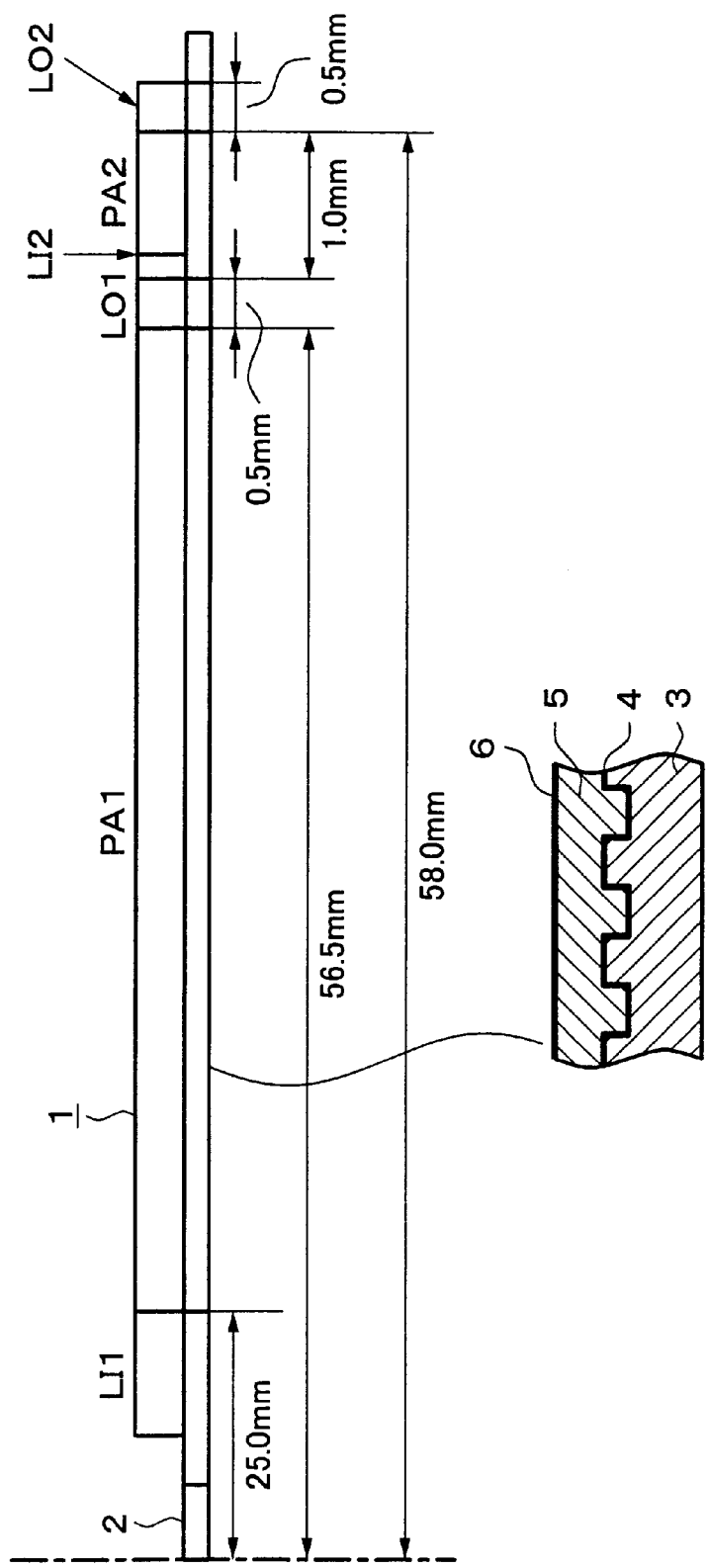

FORMAT OF Q CHANNEL

FORMAT OF DATA BITS

FORMAT OF DATA BITS

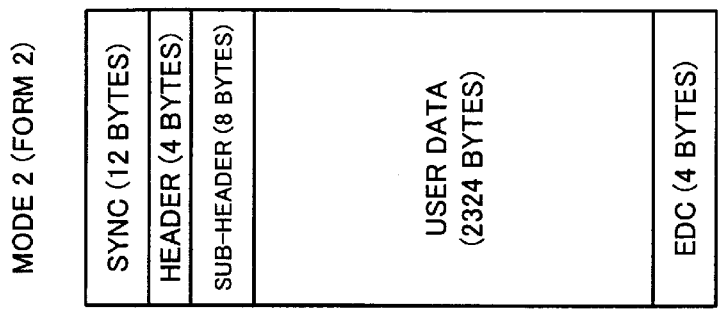
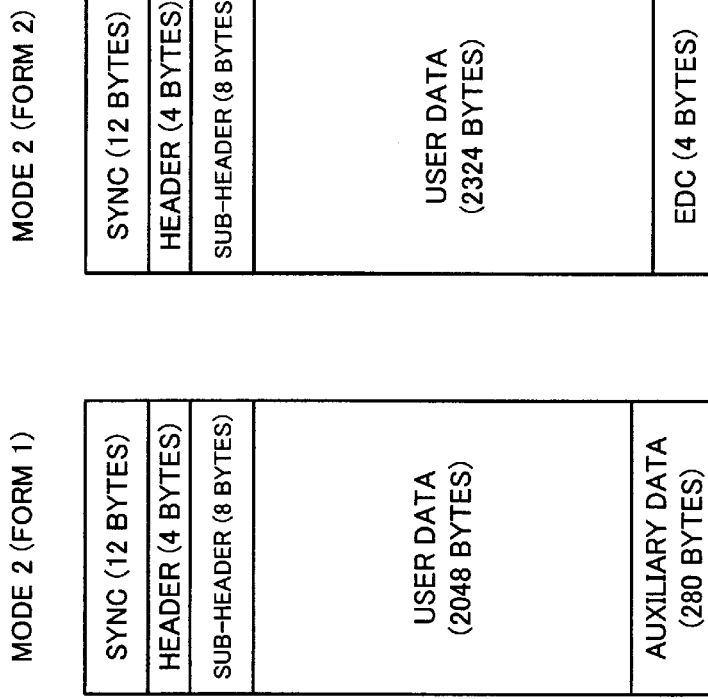
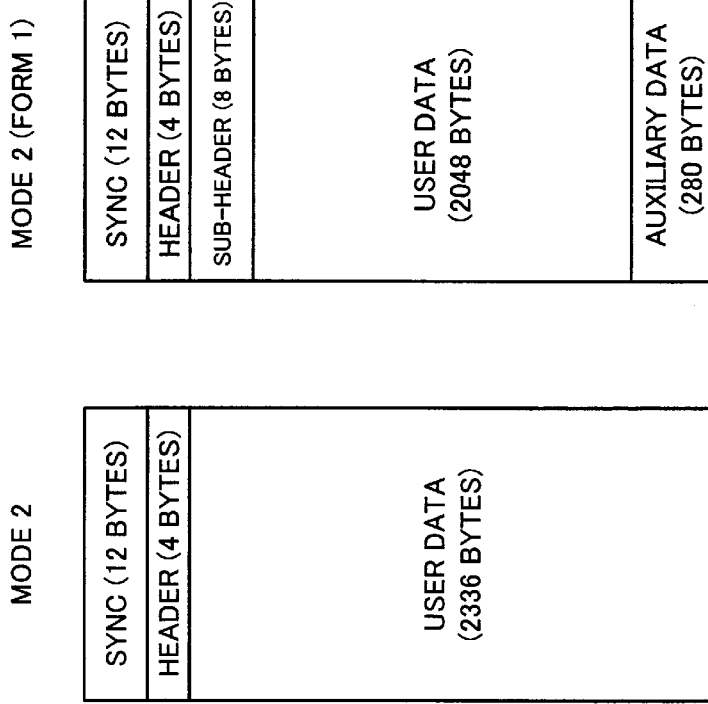
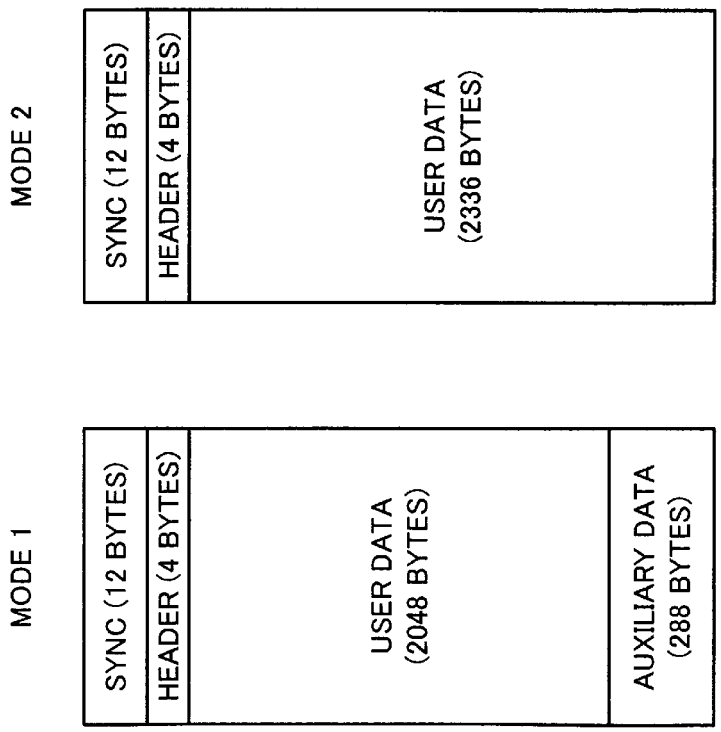

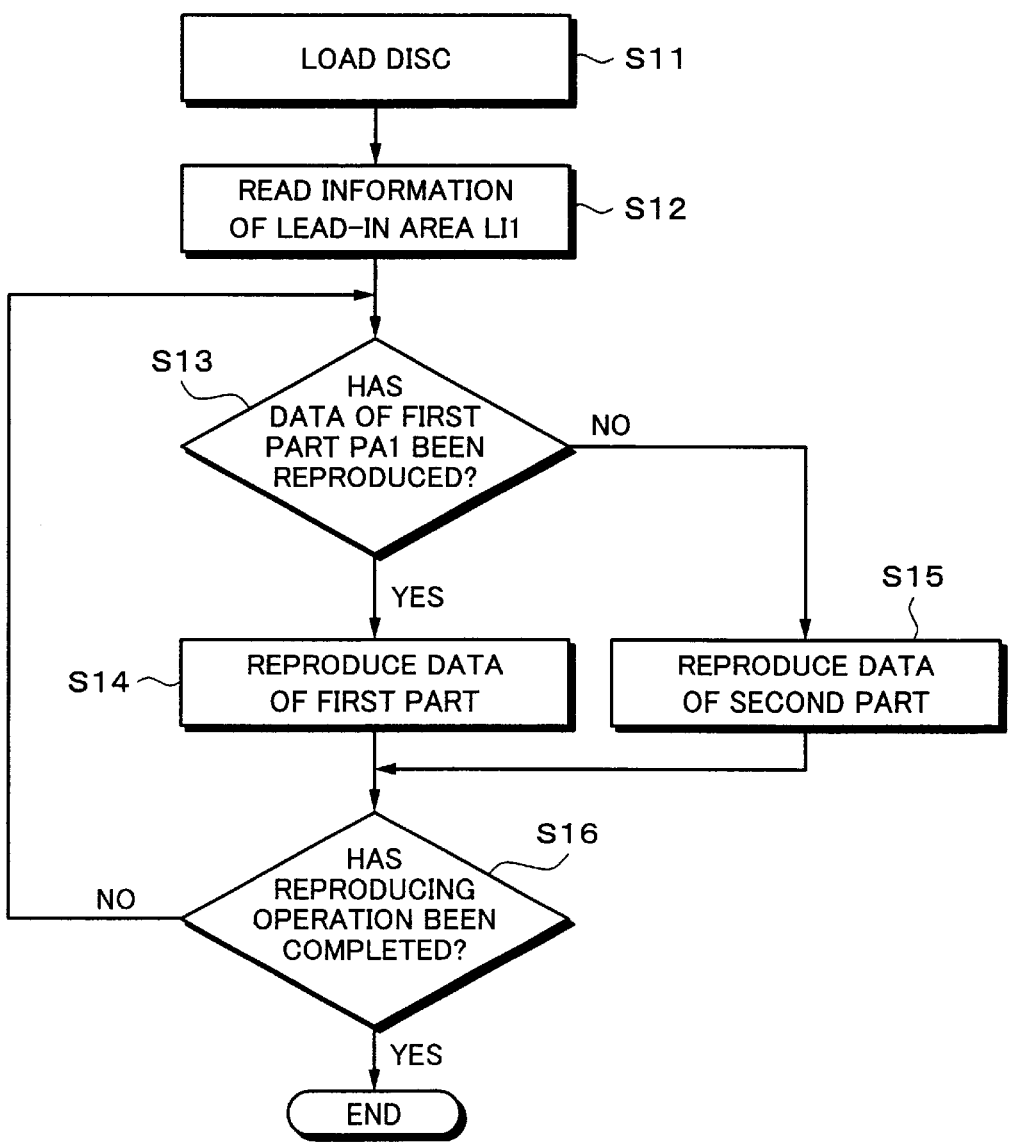

OPTICAL STORAGE MEDIUM HAVING TWO RECORDING AREAS OF DIFFERENT FORMATS

BACKGROUND OF THE INVENTION

1. Field of the Invention

The present invention relates to a data record medium, a data recording method, a data recording apparatus, an accessing method, and an accessing apparatus applied to for example optical discs.

2. Description of the Related Art

The standard for compact discs (CD), which are common nowadays, is called compact disc audio (CDDA) and based on standard book (referred to as Red Book). Based on the standard book, various formats have been standardized as so-called CD family. As an extended format of CD, the applicant of the present invention has proposed a data record medium having two record areas. The proposed data record medium has an inner record area (referred to as first area) and an outer record area (referred to as second area). The first area has compatibility with CD. However, the second area does not have it. In the second area, audio data that has been compressed and encrypted is recorded. In addition, the record density of the first area is the same as that of conventional CD (namely, single density). On the other hand, the record density of the second area is twice as high as that of conventional CD (namely, double density).

As a method for recording data in double density, the track pitch is narrowed and/or the linear velocity is decreased. In the case of a read-only disc such as CD, a master disc is created by a mastering device. In this case, since the track pitch and/or linear velocity differ in the two record areas, it takes a time to switch those parameters. Thus, it is difficult to successively record data to the two record areas. As a result, a non-record portion (gap) takes place between the two record areas.

When there is a non-record portion, a problem of how to record addresses takes place. As one method for solving such a problem, addresses may be successively assigned to the first record area and the second record area. In such a case, when the two record areas are successively accessed through the non-record portion, a problem occurs. In other words, the traveling amount of the pickup that accesses the first record area or the second record area differs from that of the pickup that successively accesses the first record area and second record area in the address change amount (difference).

As another method, addresses are zero-reset and assigned to the first record area and the second record area. In this case, the same address is redundantly assigned to the two record areas. Thus, when the first record area and the second record area are successively accessed, a problem takes place. In addition, when the first record area and the second record area are accessed, the traveling amount in the radius direction of the disc is detected by counting the number of tracks that the pickup traverses using a track traverse signal. However, in a non-record portion, since there is no track, when the pickup traverses the non-record portion, the traveling amount in the radius direction cannot be accurately detected.

OBJECTS AND SUMMARY OF THE INVENTION

Therefore, an object of the present invention is to provide a data record medium, a data recording method, a data recording apparatus, an accessing method, and an accessing apparatus that allow a problem of which two areas are not successively accessed due to a non-record portion to be solved.

To solve the above-described problem, a first aspect of the present invention is a data record medium having at least two record area and a non-record area formed therebetween, wherein assuming that addresses are assigned to the non-record area, addresses are assigned to the record areas.

A second aspect of the present invention is a data recording method for recording data to a record medium having at least two record area and a non-record area formed therebetween, wherein assuming that addresses are assigned to the non-record area, addresses are assigned to the record areas.

A third aspect of the present invention is a data recording apparatus for recording data to a record medium having at least two record area and a non-record area formed therebetween, comprising a means for recording data to the record areas so that assuming that addresses are assigned to the non-record area, addresses are assigned to the record areas.

A fourth aspect of the present invention is an accessing method for accessing a data record medium having at least two record areas and a non-record area formed therebetween, addresses being successively assigned to the record areas, comprising the steps of converting the length of the non-record area into the variation amount of an address, and accessing a desired position corresponding to the converted address.

A fifth aspect of the present invention is an accessing apparatus for accessing a data record medium having at least two record areas and a non-record area formed therebetween, addressed being successively assigned to the record areas, comprising a means for converting the length of the non-record area into the variation amount of an address and generating addresses, and a means for accessing a desired position of the data record medium corresponding to the generated addresses.

According to the present invention, even if there is a non-record portion between two record areas, since it is assumed that addresses have been assigned to the non-record portion, the two areas can be successively accessed without problem.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 1A and 1B are schematic diagrams for explaining disc shaped record mediums according to the present invention;

FIG. 2 is a schematic diagram for explaining an example of areas of a disc according to the embodiment of the present invention;

FIG. 3 is a schematic diagram for explaining the dimensions of the disc according to the embodiment of the present invention;

FIGS. 10A, 10B, 10C, and 10D are schematic diagrams showing examples of the format of data of CD-ROM according to the present invention;

FIG. 14 is a flow chart for explaining the operation of the reproducing apparatus.

DETAILED DESCRIPTION OF THE PREFERRED EMBODIMENT

Figure 4:
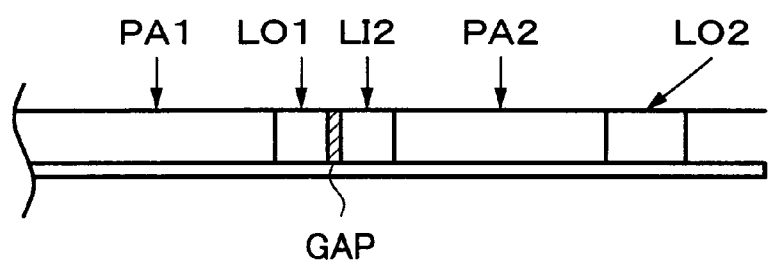
FIG. 4 is a schematic diagram for explaining a non-record portion formed between two areas.

Next, an embodiment of the present invention will be described. In FIG. 1A, reference numeral 1 represents a record medium such as a disc according to the present invention. On the disc 1, a program area thereof is divided into two portions in the radius direction. As a result, a first record area (referred to as first part) PA1 and a second record area (referred to as second part) PA2 are formed. The first part PA1 is formed on the inner periphery side, whereas the second part PA2 is formed on the outer periphery side. In the first part PA1, first content data as non-compressed data for example first audio data is recorded. In the second part PA2, second content data as compressed data such as second audio data is recorded. Reference numeral 2 represents an opening portion. When necessary, the second audio data is encrypted data.

In FIG. 1B, reference numeral 1' represents another example of a disc according to the present invention. On the disc 1', a program area thereof is divided into three portions in the radius direction. As a result, a first part PA1, a second part PA2, and a third part PA3 are formed. In the first part PA1 and the second part PA2, first data and second data as non-compressed data are recorded. In the third part PA3, third data as compressed data is recorded. The number of program areas formed in the radius direction is not limited to two and three shown in FIGS. 1A and 1B. In other words, the number of program areas can be freely selected. In addition, the first part, the second part, and so forth may be successively arranged from the outer periphery side rather than the inner periphery side.

Next, an embodiment of the present invention will be described in detail. According to the embodiment, two program areas are formed as shown in FIG. 1A. According to the embodiment, the compatibility with conventional CD is considered. FIG. 2 shows areas of the disc 1. On the outer periphery of a clamping area formed on the innermost periphery, a lead-in area LI1 is formed. On the outer periphery side of the lead-in area LI1, a first part PA1 is formed. On the outer periphery side of the first part PA1, a lead-out area LO1 is formed. On the outer periphery side of the lead-out area LO1, a lead-in area LI2 is formed. On the outer periphery side of the lead-in area LI2, a lead-out area LO2 is formed. The areas LI1, PA1, and LO1 structure a first session. The areas LI2, PA2, and LO2 structure a second session.

FIG. 3 shows the dimensions of the disc 1. The dimensions of the disc 1 are the same as those of CD. In FIG. 3, a dot-dash line represents the center position of the disc 1. As shown in FIG. 3 as an enlarged partial view of the disc 1, the thickness of the disc 1 is 1.2 mm. On a polycarbonate substrate 3 having a thickness of 1.2 mm, an aluminum reflection layer 4 (40 to 80 nm), a protection layer 5 (10 to 20 $\mu$m), and a label 6 are laminated. On the substrate 3, pits (concave and convex portions) corresponding to data are formed. By radiating a laser beam to the lower side of the substrate 3, the presence and absence of the pits are read as the light amount difference of the reflected light.

The lead-in area LI1 is formed from 23 mm to 25 mm in the radius direction starting from the center of the disc. In the case of the conventional CD, a program area is formed on the outer periphery side in the range from the center of the disc to 58 mm in the radius direction. A lead-out area is formed on the outer periphery side of the program area in the range from the center of the disc to 58.5 mm in the radius direction.

According to the standard of the conventional CD (referred to as Red Book), the track pitch is 1.6 $\mu$m±0.1 $\mu$m and the linear velocity as CLV (Constant Linear Velocity) is in the range from 1.2 m/s to 1.4 m/s. When the data format of record data complies with the standard, the minimum bit length on CD depends on the linear velocity. When the linear velocity is 1.25 m/s, the minimum time length (the time length of which the number of zeros between ones of record signal is the minimum) Tmin of the EFM modulating system (eight to fourteen modulation: EFM) is 3T. The bit length for 3T is 0.87 $\mu$m. The bit length for T is the minimum bit length. The maximum reproduction time (74.7 minutes) is accomplished in the case that the track pitch is 1.6 $\mu$m and the linear velocity is 1.2 m/s.

According to the embodiment, a digital audio signal is recorded in the same signal format as the conventional CD to the first part PA1. In this case, with the lower limit value (1.5 $\mu$m) as an allowable value of the track pitch and the lower limit value (1.2 m/s) as an allowable value of the linear velocity according to the CD standard, the audio data is recorded. As a result, in the range from the center of the disc to 56.5 mm in the radius direction (namely, the first part PA1), digital audio data (in the CD format) of the maximum reproduction time (74.7 minutes) is recorded. On the outer periphery side of the first part PA1, the range for 0.5 mm in the radius direction is the lead-out area LO1.

The lead-in area LI1, the first part PA1, and the lead-out area LO1 that are recorded in such a manner satisfy the CD standard. Thus, a conventional CD reproducing apparatus can reproduce audio data recorded in the first part PA1 without a problem.

In the range from the center of the disc to 58 mm in the radius direction, on the outer periphery side of the lead-out area LO1, there is an area for 1 mm in the radius direction. In the range for 1 mm, the lead-in area LI2 and the second part PA2 are formed. In the range for 0.5 mm, on the outer periphery side of the second part PA2, the lead-out area LO2 is formed. As a result, the length from the center of the disc 1 to the lead-out area LO2 becomes 58.5 mm. Thus, the disc 1 satisfies the dimensions required in the CD standard. The length in the radius direction from the center of the substrate to the outermost periphery is 60 mm (thus, the diameter thereof is 120 mm).

The above-described dimensions (LI2+PA2=1.0 mm; LO2=0.5 mm) are a first dimensional example. As a second dimensional example that satisfies the dimensions of the CD standard, dimensions (LI2=0.1 mm; PA2=1.1 mm; LO2=0.3 mm) are available. As a third dimensional example, dimensions (LI2=0.1 mm; PA2=3.1 mm; LO2=0.3 mm) of which the length in the radius direction from the center of the disc to the lead-out area LO1 is 54.5 mm (narrowed by 2 mm from 56.5 mm) is also available.

In brief, audio data in the same format as 25 conventional CD is recorded to the first part PA1 (since the audio data is non-compressed data, it is referred to as linear PCM). Compressed audio data in single density or double density is recorded to the second part PA2. The single density represents the same record density as the conventional CD (track pitch=1.6 μm±0.1 μm; linear velocity=1.2 m/s to 1.4 m/s), whereas the double density represents the record density twice as high as the single density. Audio data recorded in the second part is data to be copyright-protected. The format of data recorded in the second part PA2 is for example the CD-ROM format. To accomplish the double density for the second part PA2, the track pitch is narrowed and/or the linear velocity is decreased. In reality, by narrowing the track pitch to 1.1 μm and decreasing the linear velocity to around 0.9 m/s, the double density can be accomplished.

Next, assuming that the record density of the first part PA1 is single density and the record density of the second part PA2 is double density, the data amount that is recorded to the disc 1 will be described. The linear PCM of CD-DA is data sampled at 44.1 kHz and linear-quantized with 16 bits. In stereo, the information amount becomes (2×16×44.1 k≈1.4 Mbps). bps represents bits/second. When the audio data is compressed with a compression rate of ¹⁄₁₀ by for example ATRAC3, the information amount becomes 128 kbps. The compression rate of ATRAC used in MD (Mini Disc) is around ⅕. The compression rate of ATRAC3 is higher than that of ATRAC. In the second dimensional example, as with CD-DA, linear PCM for 74.7 minutes can be recoded to the first part PA1. ATRAC3 compressed audio data for 74.7 minutes can be recorded to the second part PA2.

The audio data recorded to the second part PA2 is not limited to audio data of CD-DA. In other words, besides stereo signals, multi-channel audio data of for example 5.1-channel system can be recorded. In addition, it is not necessary to limit the sampling frequency and the number of quantizing bits to the above-described values. For example, audio data with a sampling frequency of 96 kHz and 24 quantizing bits may be compressed and recorded to the second part. When audio data is compressed corresponding to ATRAC3, the information amount of compressed data becomes 384 kbps. In the second dimensional example (PA2=3.1 mm), linear PCM for 68.2 minutes can be recorded to the first part PA1, whereas compressed audio data for 68.2 minutes (384 kbps) can be recorded to the second part PA2.

It is not always necessary to cause the record density of the first part to be different from that of the second part. For example, in the above-described first dimensional example (LI2+PA2=1.0 mm; LO2=0.5 mm), linear PCM for 74.7 minutes is recorded to the first part PA1, whereas compressed audio data for 35 minutes (128 kbps) in single density (linear velocity=1.2 m/s; track pitch=1.5 μs) is recorded to the second part PA2.

In the case of the disc shown in FIG. 3, a lead-out area LO1 and a lead-in area LI2 are formed between the first part PA1 and the second part PA2. In reality, due to the structure of a recording apparatus (mastering device) that will be described later, while the record density is switched from one to another, since no data is recorded, a non-record portion as a gap (so-called mirror surface) takes place.

On the disc 1 having a plurality of record areas according to the present invention, in addition to the same data as conventional TOC (Table Of Contents) recorded in the lead-in area LI1 that is initially reproduced upon loaded to the reproducing apparatus, additional information is recorded thereto. The additional information contains an identification that represents a plurality of parts and information of parts. In addition, the additional information contains information that represents whether or not data has been encrypted and information that represents the type of encryption. Moreover, the additional information contains a start address and an end address that represent the start position and end position of the record area of the first part, respectively.

According to the embodiment, the addressing system of the first session composed of LI1, PA1, and LO1 is different from the addressing system of the second session composed of LI2, PA2, and LO2. However, it should be noted that according to the present invention, it is not always necessary to cause the addressing system of the first session to be different from the addressing system of the second session. As the address notation for the first session, as with the conventional CD, M (minute), S (second), and F (frame) in BCD notation are used. As the address notation for the second session, H (hour), M (minute), S (second), and F (frame) in BCD notation are used. Alternatively, as the address notation for the second session, binary notation may be used. The reason why the addressing system for the second session is different from that for CD is in that data in double density recorded in the second part may cause addresses that exceed the maximum value of the addresses of M (minute), S (second), and F (frame) in BCD notation to take place.

Figure 5:
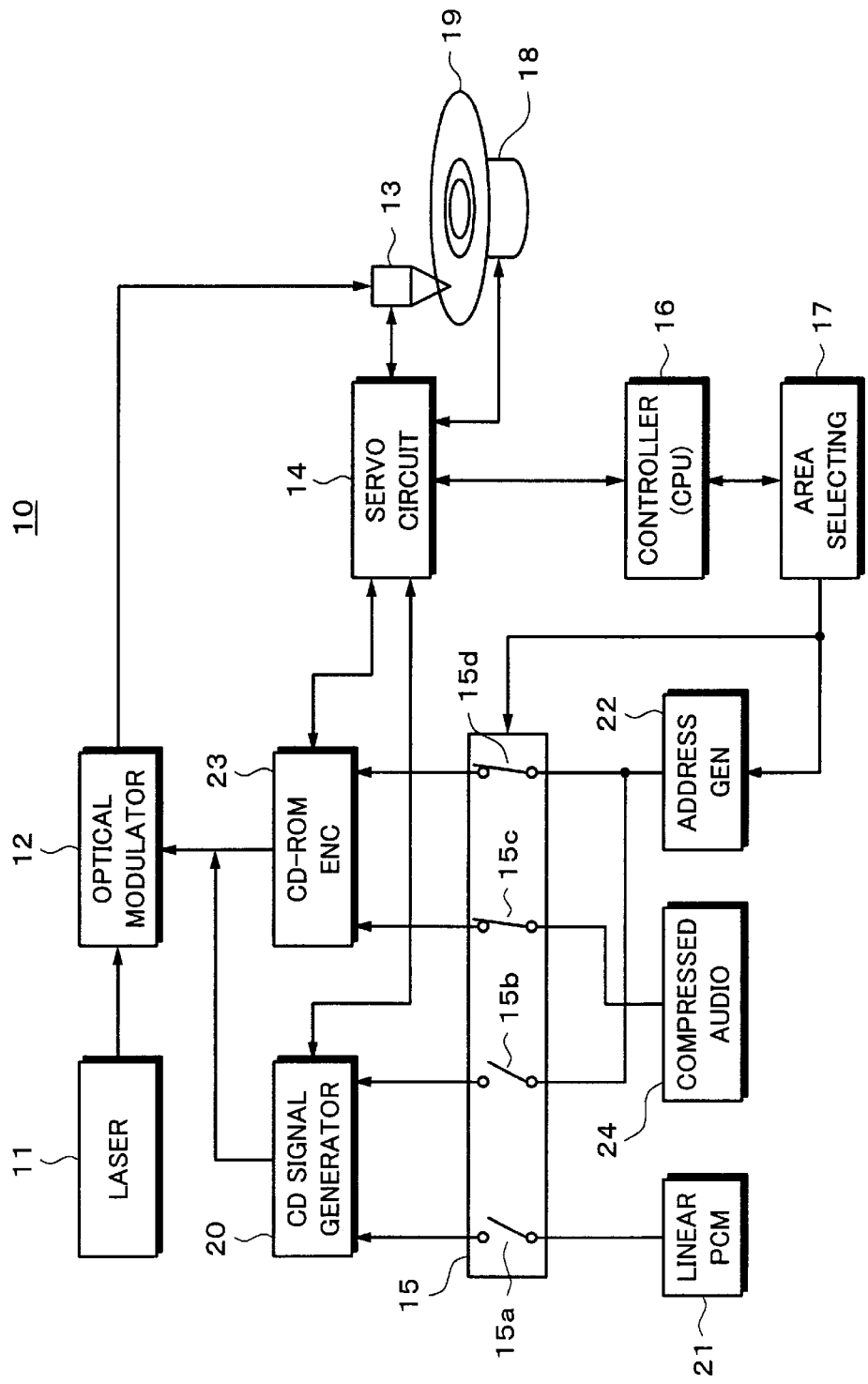
FIG. 5 is a block diagram showing the structure of a mastering device according to the embodiment of the present invention.

Next, with reference to FIG. 5, the recording apparatus for the disc 1 (namely, the mastering device) will be described. In this example, it is assumed that the disc 1 has a first part PA1 of single density and a second part PA2 of double density. In FIG. 5, reference numeral 10 represents the overall structure of the mastering device. The mastering device 10 has a laser 11, an optical modulator 12, and an optical pickup 13. The laser 11 is a gas laser (such as Ar ion laser, He—Cd laser, or Kr ion laser) or a semiconductor laser. The optical modulator 12 is an acoustic optical effect type modulator that modulates laser light radiated from the laser 11. The optical pickup 13 is a recording means that has an objective lens that collects laser light that passes through the optical modulator 12 and radiates the laser light to a photoresist surface of a glass master disc 19 on which a photo-resist as a photosensitive material is coated.

The optical modulator 12 modulates laser light radiated from the laser 11 corresponding to a record signal. The mastering device 10 radiates the modulated laser light to the glass master disc 19 so as to create a maser of which data is recorded to each part. In addition, the mastering device 10 has a servo circuit 14 that controls the optical pickup 13 so that the distance between the optical pickup 13 and the glass master disc 19 becomes constant. In addition, the servo circuit 14 controls the rotating and driving operations of a spindle motor 18. The glass master disc 19 is rotated and driven by the spindle motor 18.

A record signal is supplied from a CD signal generator 20 to the optical modulator 12. Alternatively, a record signal is supplied from a CD-ROM encoder 23 to the optical modulator 12. The CD signal generator 20 generates a signal recorded to the first area. The CD-ROM encoder 23 generates a signal recorded to the second area. A linear PCM signal 21 as record data is supplied to the CD signal generator 20 through a switch 15a. In addition, an address signal is supplied from an address generating portion 22 to the CD signal generator 20 through a switch 15b. A compressed audio signal 24 as record data is supplied to the CD-ROM encoder 23 through a switch 15c. In addition, an address signal is supplied from the address generating portion 22 to the CD-ROM encoder 23 through a switch 15d.

The switches 15a to 15d compose a selector 15. The selector 15 is controlled with a selection signal supplied from an area selecting circuit 17 that is controlled by a controller 16. In other words, when data is recorded to the first part PA1, lead-in area LI1, and lead-out area LO1, the switches 15a and 15b are turned on. When data is recorded to the second part PA2, lead-in area LI2, and lead-out area LO2, the switches 15c and 15d are turned on. In addition, the area selecting circuit 17 generates a selection signal corresponding to a non-record portion formed between the lead-out area LO1 and the lead-in area LI2. The length of the non-record portion is pre-set. In the non-record portion, all the switches 15a to 15d are turned off. In the non-record portion, required switching operations for example track pitch and linear velocity are performed.

The address generating portion 22 generates addresses for both the two areas. A selection signal is supplied from the area selecting circuit 17 to the address generating portion 22. As the area is switched, the type of generated addresses is switched. In addition, the controller 16 controls the servo circuit 14 as the-area is switched so as to control the track pitch and the linear velocity of each area. Moreover, the controller 16 controls the overall operations of the mastering device 10.

To switch the record density between the two record areas, it is necessary to control the track pitch and/or linear velocity. For example, at the switching position, the recording operation is temporarily stopped and then the track pitch and/or linear velocity (the rotation of the spindle motor 18) is changed. In this case, a non-record area (so-called mirror surface) takes place between the two areas.

The CD signal generator 20 converts the linear PCM signal 21 and sub-code (supplied from the address generating portion 22) into CD format data. In other words, 16 bits of one sample or one word are divided into a high order eight-bit portion and a low order eight-bit portion. Each of the high order eight-bit portion and the low order eight-bit portion is treated as a symbol. In the unit of a symbol, an error correction encoding process (for adding parity data and so forth for correcting an error corresponding to for example CIRC (Cross Interleave Reed-Solomon Code) and a scrambling process are performed and then modulated corresponding to EFM (Eight to Fourteen Modulation). In addition to TOC data of CD-DA, the address generating portion 22 generates additional information that contains information of the parts as data that is recorded to the lead-in area LI1. When necessary, the mastering device 10 also has an encrypting circuit (not shown) that encrypts the additional information.

The CD-ROM encoder 23 converts the format of data that is recorded to the second part into the data format of CD-ROM (the data format of CD-ROM will be described later). As an example of the compression-encoding method, AAC (Advanced Audio Coding) of MPEG2 (Moving Picture Experts Group Phase 2), MP3 (MPEG1 Audio Layer III), ATRAC (Adaptive Transform Acoustic Coding), ATRAC3, or the like can be used. ATRAC3 is a modification of ATRAC used in MD and accomplishes a higher compression rate (around $1/10$) than ATRAC.

The glass master disc 19 recorded by the mastering device 10 is developed and electrically formed. As a result, a metal master is created. With the metal master, a mother disc is created. Thereafter, with the mother disc, a stamper is created. With the stamper, CDs are created by compression molding method, injection molding method, or the like.

Figure 6:
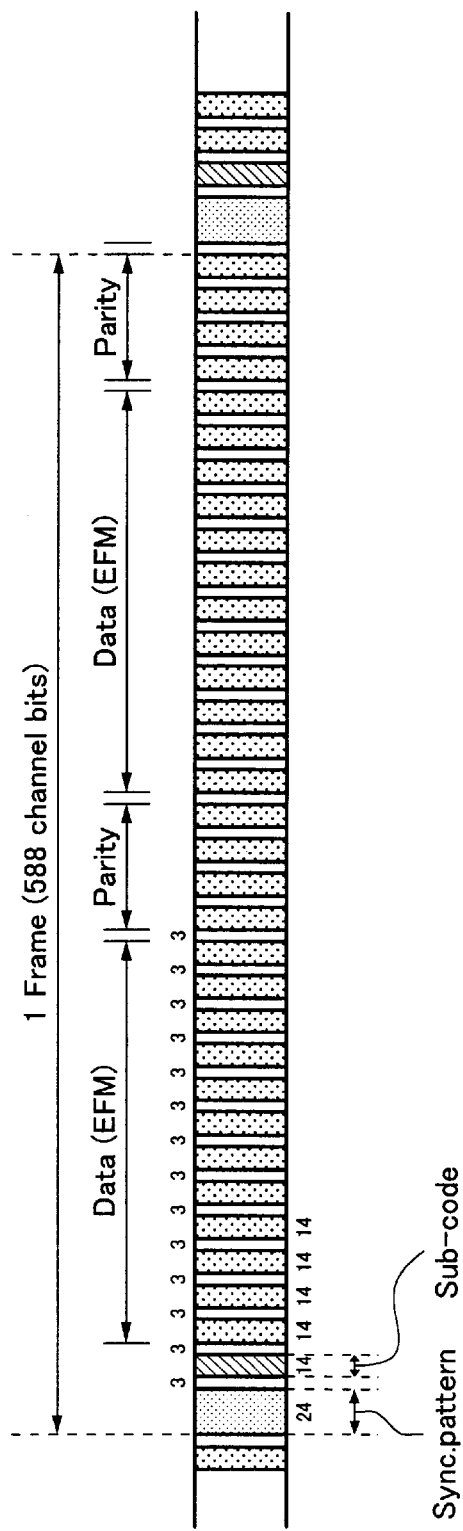
FIG. 6 is a schematic diagram showing an example of the format of a frame according to the embodiment of the present invention.

Next, signals that are recorded to the each part will be described. FIG. 6 shows the data structure of one frame of a CD signal. In CD, with a total of 12 samples (24 symbols) of two channels of digital audio data, parity Q and parity P are generated. Each of parity Q and parity P is composed of four symbols. 33 symbols of which one symbol of sub-code is added to 32 symbols (namely, 264 data bits) are treated as one block. In other words, one frame that has been modulated corresponding to EFM contains a total of 33 symbols that are sub-code of one symbol, data of 24 symbols, Q parity of four symbols, and P parity of four symbols.

When the EFM-modulation is performed, each symbol (eight data bits) is converted into 14 channel bits. A connection bit portion of three bits is formed between adjacent 14-channel bit portions. In addition, a frame sync pattern is added at the beginning of each frame. The frame sync pattern is composed of sequences 11T, 11T, and 2T (where T is a period of a channel bit). Since such a pattern does not take place in the EFM modulation rule, a frame sync is detected with such a special pattern. One frame is composed of a total of 588 channel bits.

With 98 frames, a sub-code frame is formed. A sub-code frame of which 98 frames are successively arranged in the vertical direction is composed of a frame synchronous portion, a sub-code portion, a data portion, and a parity portion. The frame synchronous portion identifies the beginning of the sub-code frame. A sub-code frame is equivalent to $1/75$ seconds of reproduction time of conventional CD.

Sub-code generated by the address generating portion 22 is recorded to the sub-code portion. The sub-code portion is composed of 98 frames. Two frames at the beginning of the sub-code portion serve for both a synchronous pattern of a sub-code frame and an out-of-rule pattern of EFM. In addition, the individual bits of the sub-code portion form P, Q, R, S, T, U, V, and W channels, respectively.

R to W channels are used for a special purpose for a still picture such as Karaoke's subtitle. P and Q channels are used for the track position controlling operation for the pickup in reproducing digital data recorded on the disc.

In the lead-in area of the inner periphery portion of the disc, P channel is used to record a signal whose level is "0". In the lead-out area of the outer periphery portion of the disc, P channel is used to record a signal whose level changes between "0" and "1" at a predetermined period. In the program area formed between the lead-in area and the lead-out area of the disc, P channel is used to record a signal whose level is "1" between music programs and whose level is "0" in each program. P channel is used to detect the beginning of each music program in reproducing digital audio data recorded on CD.

Figure 7:
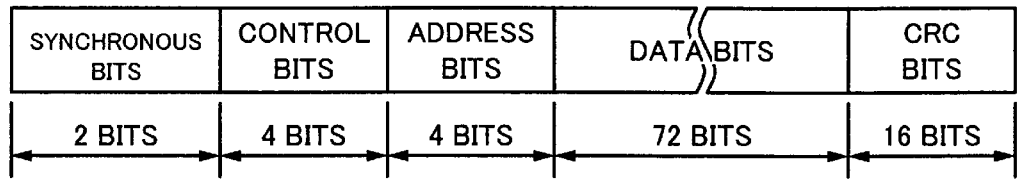
FIG. 7 is a schematic diagram showing an example of the format of Q channel according to the embodiment of the present invention.

Q channel is used to precisely control the reproducing operation of digital audio data recorded on CD. As shown in FIG. 7, one sub-code frame of Q channel is composed of a synchronous bit portion 51, a control bit portion 52, an address bit portion 53, a data bit portion 54, and a CRC bit portion 55.

The synchronous bit portion 51 is composed of data of two bits. A part of the above-described synchronous pattern is recorded to the synchronous bit portion 51. The control bit portion 52 is composed of data of four bits. Data that represents the number of audio channels and identifications for emphasis, digital data, and so forth is recorded to the control bit portion 52. When the data of four bits of the control bit portion 52 is "0000", the data represents that 2-channel audio without pre-emphasis. When the data of four bits of the control bit portion 52 is "1000", the data represents 4-channel audio without pre-emphasis. When the data of four bits of the control bit portion 52 is "0001", the data represents 2-channel audio with pre-emphasis. When the data of four bits of the control bit portion 52 is "1001", the data represents 4-channel audio with pre-emphasis. When the data of four bits of the control bit portion 52 is "0100", the data represents non-audio data track. The address bit portion 53 is composed of data of four bits. A control signal that represents the format and type of data stored in the data bit portion 54 is recorded to the address bit portion 53. The CRC bit portion 55 is composed of data of 16 bits. Data for detecting an error of cyclic redundancy check code (CRC) is recorded to the CRC bit portion 55.

Figure 8:
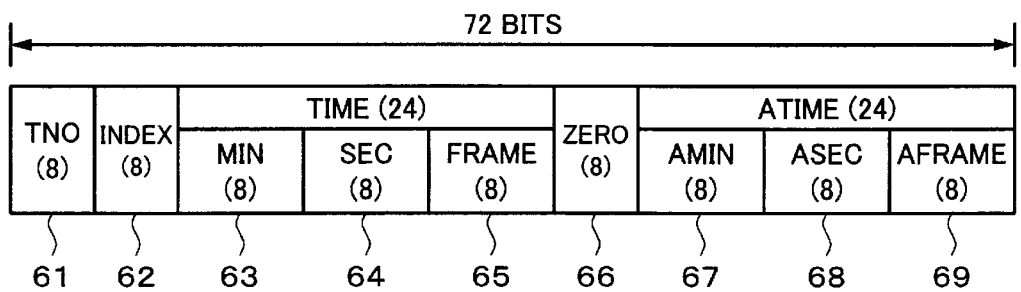
FIG. 8 is a schematic diagram showing an example of the format of data bits according to the embodiment of the present invention.

The data bit portion 54 is composed of data of 72 bits. When the data of four bits of the address bit portion 53 is "0001", as shown in FIG. 8, the data bit portion 54 is composed of a track number portion (TNO) 61, an index portion (INDEX) 62, an elapsed time minute component portion (MIN) 63, an elapsed time second component portion (SEC) 64, an elapsed time frame number portion (FRAME) 65, a zero portion (ZERO) 66, an absolute time minute component portion (AMIN) 67, an absolute time second component portion (ASEC) 68, and an absolute time frame number portion (AFRAME) 69. Each portion of the data bit portion 54 is composed of data of eight bits.

The track number portion (TNO) 61 is represented in two-digit binary coded decimal (BCD) notation. When the track number portion (TNO) 61 is "00", it represents a lead-in track number of a track from which data reading operation starts. When the track number portion (TNO) 61 is "01" to "99", it represents a track number corresponding to a music program number, a movement number, or the like. When the track number portion (TNO) 61 is "AA" in hexadecimal notation, it represents a lead-out track number of a track at which the data reading operation stops.

The index portion (INDEX) 62 is represented in 2-digit BCD notation. When the index portion (INDEX) 62 is "00", it represents pause. When the index portion (INDEX) 62 is "01" to "99", it represents a sub-track number of a music program, a movement, or the like.

Each of the elapsed time minute component portion (MIN) 63, the elapsed time second component portion (SEC) 64, and the elapsed time frame number portion (FRAME) 65 is represented in 2-digit BCD notation. The elapsed time minute component portion (MIN) 63, the elapsed time second component portion (SEC) 64, and the elapsed time frame number portion (FRAME) 65 represent elapsed time (TIME) of each music program or each movement with a total of six digits. Eight bits of the zero portion (ZERO) 66 are all "0s".

Each of the absolute time minute component portion (AMIN) 67, the absolute time second component portion (ASEC) 68, and the absolute time frame number portion (AFRAME) 69 is denoted in 2-digit BCD notation. The absolute time minute component portion (AMIN) 67, the absolute time second component portion (ASEC) 68, and the absolute time frame number portion (AFRAME) 69 represent the elapsed time (ATIME) starting from the first music program with a total of six digits.

Figure 9:
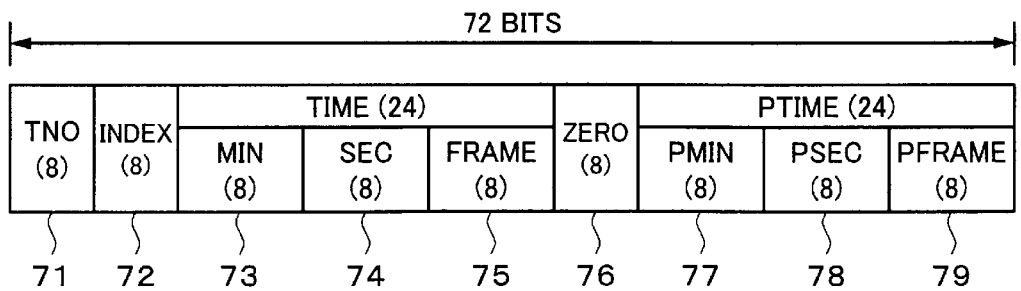
FIG. 9 is a schematic diagram showing an example of the format of data bits of TOC according to the embodiment of the present invention.

As shown in FIG. 9, the data bit portion 54 of TOC (Table Of Contents) of the lead-in area of the disc is composed of a track number portion (TNO) 71, a point portion (POINT) 72, an elapsed time minute component portion (MIN) 73, an elapsed time second component portion (SEC) 74, an elapsed time frame number portion (FRAME) 75, a zero portion (ZERO) 76, an absolute time minute component portion (PMIN) 77, an absolute time second component portion (PSEC) 78, and an absolute time frame number portion (PFRAME) 79. Each of the portions of the data bit portion 54 is composed of data of eight bits.

Each of the track number portion (TNO) 71, the elapsed time minute component portion (MIN) 73, the elapsed time second component portion (SEC) 74, and the elapsed time frame number portion (FRAME) 75 is fixed to "00" in hexadecimal notation. As with the abovedescribed zero portion (ZERO) 66, all the eight bits of the zero portion (ZERO) 76 are "0s".

When the point portion (POINT) 72 is "A0" in hexadecimal notation, the absolute time minute component portion (PMIN) 77 represents the first music program number or the first movement number. When the point portion (POINT) 72 is "A1" in hexadecimal notation, the absolute time minute component portion (PMIN) 77 represents the first music program number or the first movement number. When the point portion (POINT) 72 is "A2" in hexadecimal notation, the absolute time minute component portion (PMIN) 77, the absolute time second component portion (PSEC) 78, and the absolute time frame number portion (PFRAME) 79 represent the absolute time (PTIME) at which the lead-out area starts. When the point portion (POINT) 72 is represented in 2-digit BCD notation, each of the absolute time minute component portion (PMIN) 77, the absolute time second component portion (PSEC) 78, and the absolute time frame number portion (PFRAME) 79 represents an address at which each music program or each movement starts as absolute time (PTIME).

Thus, although in Q channel, the format in the program area of the disc is slightly different from the format in the lead-in area thereof, time information of 24 bits is recorded to Q channel.

Next, CD-ROM data format (referred to as Yellow Book) applied for data recorded to the second part PA2 will be described. In CD-ROM, 2,352 bytes of data contained in 98 frames of one period of sub-code are used as an access unit. The access unit is also referred to as block or sector. The length of each frame is 1/75 seconds that are the same as a sub-code frame. The CD-ROM data format has mode 0, mode 1, mode 2 (form 1), and mode 2 (form 2). As shown in FIG. 10, the CD-ROM data format slightly differs in each mode.

The data format of mode 0 is composed of a data portion of 2336 bytes that are all zeros. Mode 0 is used for a dummy block that causes the structure of the lead-in area and the lead-out area of the second part PA2 to be the same as the structure of CD-ROM.

As shown in FIG. 10A, the data format in mode 1 is composed of a sync portion of 12 bytes, a header portion of four bytes, a user data portion of 2048 bytes (2 kbytes), and an auxiliary data portion of 288 bytes. The sync portion contains a signal that identifies a frame. The user data portion contains objective information. The auxiliary data portion contains error detection/correction code. In mode 1, the auxiliary data portion improves the error correction performance. The data format of mode 1 is suitable for recording data with reliability such as character code or computer data.

As shown in FIG. 10B, the data format of mode 2 is composed of a sync portion of 12 bytes, a header portion of four bytes, and a user data portion of 2336 bytes. The sync portion contains a signal that identifies a frame. The user data portion contains objective information. In mode 2, an area preceded by the header portion can be used as a user data area although additional error correction code is not used. The data format of mode 2 is suitable for data that can be error-corrected by interpolating process.

As shown in FIG. 10C, the data format of mode 2 (form 1) is composed of a sync portion of 12 bytes, a header portion of four bytes, a sub-header portion of eight bytes, a user data portion of 2336 bytes, and an auxiliary data portion of 280 bytes. The sync portion contains a signal that identifies a frame. The user data portion contains objective information.

As shown in FIG. 10D, the data format of mode 2 (form 2) is composed of a sync portion of 12 bytes, a header portion of four bytes, a sub-header portion of eight bytes, a user data portion of 2324 bytes, and an EDC (Error Detection Code) portion of four bytes. The sync portion contains a signal that identifies a frame. The user data portion contains objective information.

The sub-header portion of each of mode 2 (form 1) and mode 2 (form 2) is composed of a file number, a channel number, a sub mode, coding information, a file number, a channel number, a sub mode, and coding information, each of which is composed of one byte.

According to the embodiment of the present invention, data recorded in the second part PA2 has the CD-ROM format. In this case, as the CD-ROM format, any mode of FIGS. 10A to 10D can be used. Since audio data is recorded, for example, the format of mode 1 (see FIG. 10A) is used. The data transfer rate of CD-ROM is 150 kbytes/sec.

Figure 11A:
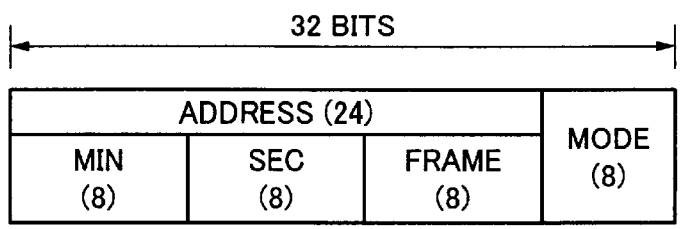
FIGS. 11A and 11B are schematic diagrams showing two examples of the format of a header portion according to the embodiment of the present invention.

The header portion of the conventional CD-ROM has the structure as shown in FIG. 11A regardless of the mode. In other words, the header portion is composed of an absolute address portion (ADDRESS) and a mode portion (MODE). The absolute address portion (ADDRESS) represents the absolute address of a frame with 24 bits of time information of minute (MIN), second (SEC), and frame number (FRAME). The mode portion (MODE) represents a mode with eight bits. The address structure of the header portion is the same as the address structure of sub-code.

The absolute address portion (ADDRESS) is composed of an absolute address minute component portion (MIN), an absolute address second component portion (SEC), and an absolute address frame number component portion (FRAME), each of which is composed of eight bits. The absolute address portion (ADDRESS) is equivalent to (just corresponds to) time information of Q channel of sub-code of the above-described CD-DA. Each of the absolute address minute component portion (MIN), the absolute address second component portion (SEC), and the absolute address frame number component portion (FRAME) is represented in 2-digit BCD notation.

On CD-ROM, the above-described sub-code portion (not shown) is additionally formed. An absolute address represented with the above-described "MIN", "SEC", and "FRAME" is recorded to Q channel.

Figure 11B:
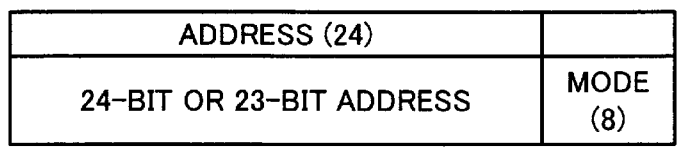

According to the embodiment, the addressing system (address notation method) for the header of the CD-ROM format of data recorded to the second part is binary notation shown in FIG. 11B rather than BCD notation shown in FIG. 11A. In binary notation, all of "MIN", "SEC", and "FRAME" of the header portion are represented in 24-bit binary notation. When addresses are represented in 24-bit binary notation, since $2^{24}=16777216$, assuming that the data amount of one frame (one sector) is 2 kbytes, data of up to around 33 Gbytes can be represented. Thus, data can be recorded in high density. When data is recorded to the second part in double density, it is preferred to use the binary notation.

In addition, with a predetermined number of bits of 24 bits, address information represented in BCD notation can be distinguished from an address represented in binary notation. For example, the most significant bit of 24 bits can be used to distinguish them. Besides the most significant bit, they can be distinguished using at least one predetermined bit. In addition, due to the fact that the address change state of time information is different from that of binary number, they can be distinguished. By distinguishing the address representations, the disc type can be determined.

The time information of Q channel of sub-code of CD-ROM data may be the same as that of the CD format. However, when the time information of sub-code is partly modified, longer time information can be represented than before. In other words, the time information of sub-code contains the zero portion (ZERO) 66 and the zero portion (ZERO) 76 whose bits are all zeros. With the zero portion (ZERO) 66 and the zero portion (ZERO) 76, the time information can be extended. For example, each of the zero portion (ZERO) 66 and the zero portion (ZERO) 76 is divided into a high order four bit portion and a low order four bit portion and assigned "HOUR" and "AHOUR" thereto. Information of hour (HOUR) is recorded to these portions. Alternatively, all eight bits or the low order four bits of each of the zero portion (ZERO) 66 and the zero portion (ZERO) 76 are used to represent the digit of 100 minutes. In this case, the time information of sub-code can be represented corresponding to high density mode.

In addition, according to the embodiment, a non-record portion (in reality, a gap) is accessed assuming that it contains data of the first session (or the second session). Thus, an operation for successively accessing two areas can be smoothly performed. For example, it is assumed that an area from the center to 50 mm in the radius direction is a first session and an area from a gap to 58 mm in the radius direction is a second session. When the gap is 30 $\mu$m and the track pitch is 1.5 $\mu$m, the gap is equivalent to 20 tracks. In this case, when the linear velocity is 1.2 m/s, the gap is equivalent to an address value of around 5 seconds and 18 frames. Thus, assuming that the gap is assigned addresses, it is necessary to process "+5 seconds and 18 frames" for the gap. When the length in the radius direction of the non-record portion is converted into an address value, it is assumed that the record density is single density or double density. In the above-described example, the gap is equivalent to "393" in binary notation.

An example of addresses that have continuity between the first area represented in MSF notation and the second area represented in binary notation will be described. When the end address of the lead-out area LO1 is "70 minutes, 10 seconds, 25 frames", the value of the start address of the lead-in area LI2 becomes "1 hour, 10 minutes, 10 seconds, 26 frames+5 seconds, 18 frames=1 hours, 10 minutes, 15 seconds, 44 frames".

Next, the case that the first area is represented in MSF notation and the second area is represented in binary notation will be described. As with the above-described example, when the end address of the lead-out area LO1 is "70 minutes, 10 seconds, 25 frames", the start address of the lead-in area LI2 is "315,776+393" (frames or sectors). "315,776" is equivalent to "70 minutes, 10 seconds, 26 frames" in MSF notation.

However, when there is a non-record portion, the end address of the first area and the start address of the second area may be successive. In this case, when the first area and the second area are successfully accessed through the non-record portion, the CPU of the drive adds a value of which the length of the non-record portion is converted into the number of tracks to the track count value (traverse count). As a simple example, the case that the end address of the first area is 10 minutes, 20 seconds, 0 frame, that the start address of the second area is 10 minutes, 20 seconds, 1 frame, and that the non-record portion is equivalent to 1 minute is considered. In the example, a command for accessing "10 minutes, 20 seconds, 1 frame" is construed as a command for accessing "11 minutes, 20 seconds, 1 frame".

In the recording apparatus shown in FIG. 5, the address generating portion 22 is controlled by the area selecting circuit 17. The address generating portion 22 generates addresses of the first session (the same addresses as CD). When the record position moves from the first session to the second session through the non-record area, the address generating portion 22 starts generating addresses of the second session from the start address. For example, the address generating portion 22 generates first addresses and second addresses in parallel and selectively outputs the first addresses or second addresses corresponding to the selection signal supplied from the area selecting circuit 17.

Figure 12:
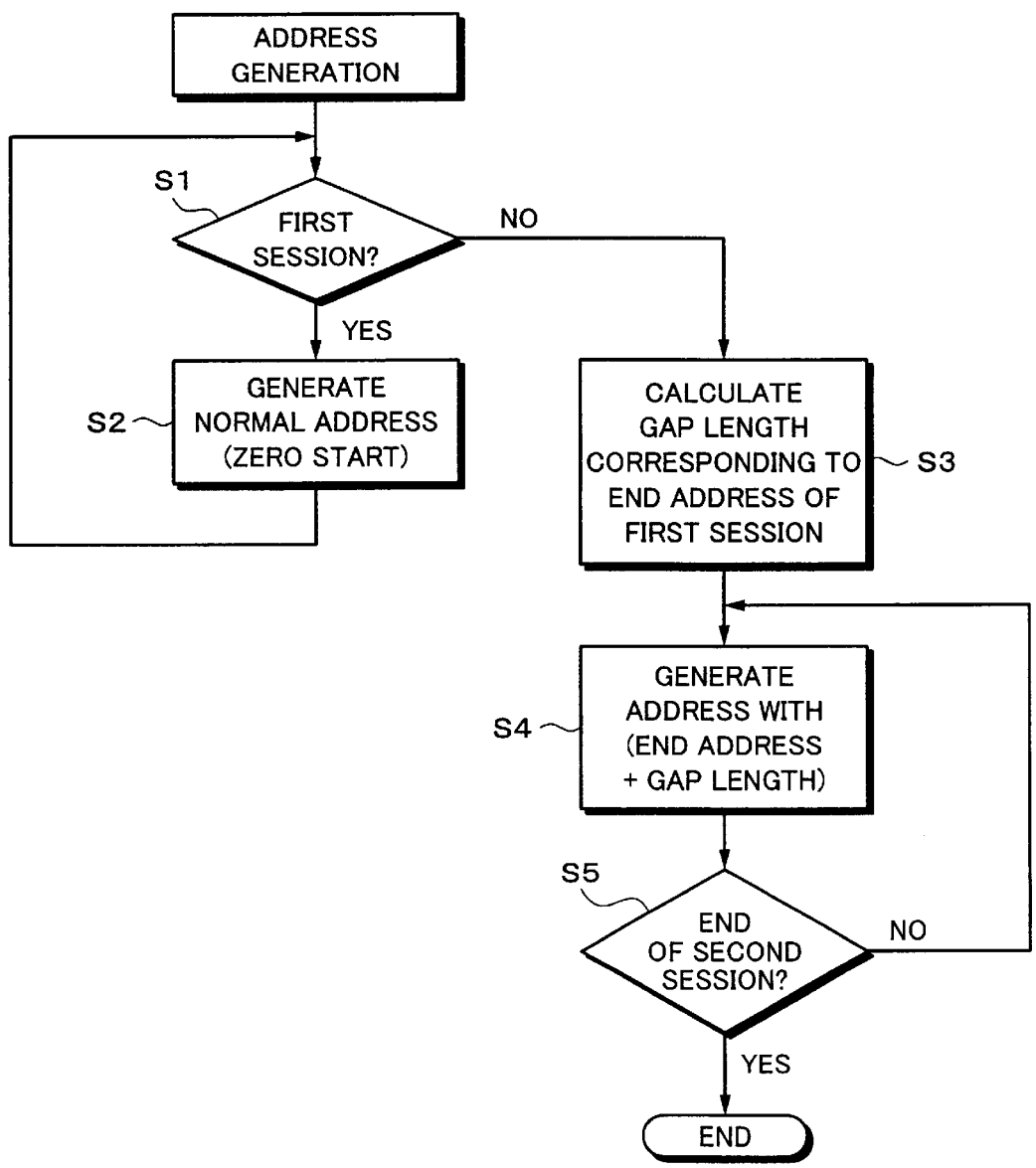
FIG. 12 is a flow chart for explaining an address generating process according to the embodiment of the present invention.

FIG. 12 is a flow chart showing an address generating process performed by the address generating portion 22. First of all, at step S1, the address generating portion 22 determines whether or not the area selection signal represents the first session. When the area selection signal represents the first session, the address generating portion 22 generates normal addresses (at step S2). The normal addresses are addresses represented in BCD notation and start with 0 minute, 0 second, 0 frame same as CD. When the determined result at step S1 represents that the area selection signal does not represent the first session, the flow advances to step S3.

At step S3, the address generating portion 22 calculates the gap length corresponding to the end address of the first session. For example, the address generating portion 22 resets the end address to zero. Until the second session starts, the address generating portion 22 generates addresses as the gap length. At step S4, the address generating portion 22 generates the start address of the second session with (end address+gap length). At step S5, the address generating portion 22 determines whether or not the second session has ended. Unless the second session ends, the address generating portion 22 continues to generate second addresses. After the second session ends, the address generating portion 22 stops generating addresses.

Next, with reference to FIG. 13, a disc reproducing apparatus will be described. The disc reproducing apparatus reproduces data from the disc 1. The disc 1 is created corresponding to a master recorded by the mastering device 10. On the disc 1, linear PCM has been recorded to the first part PA1 in CD format and compression-encoded audio data has been recorded to the second part PA2 in CD-ROM format.

Figure 13:
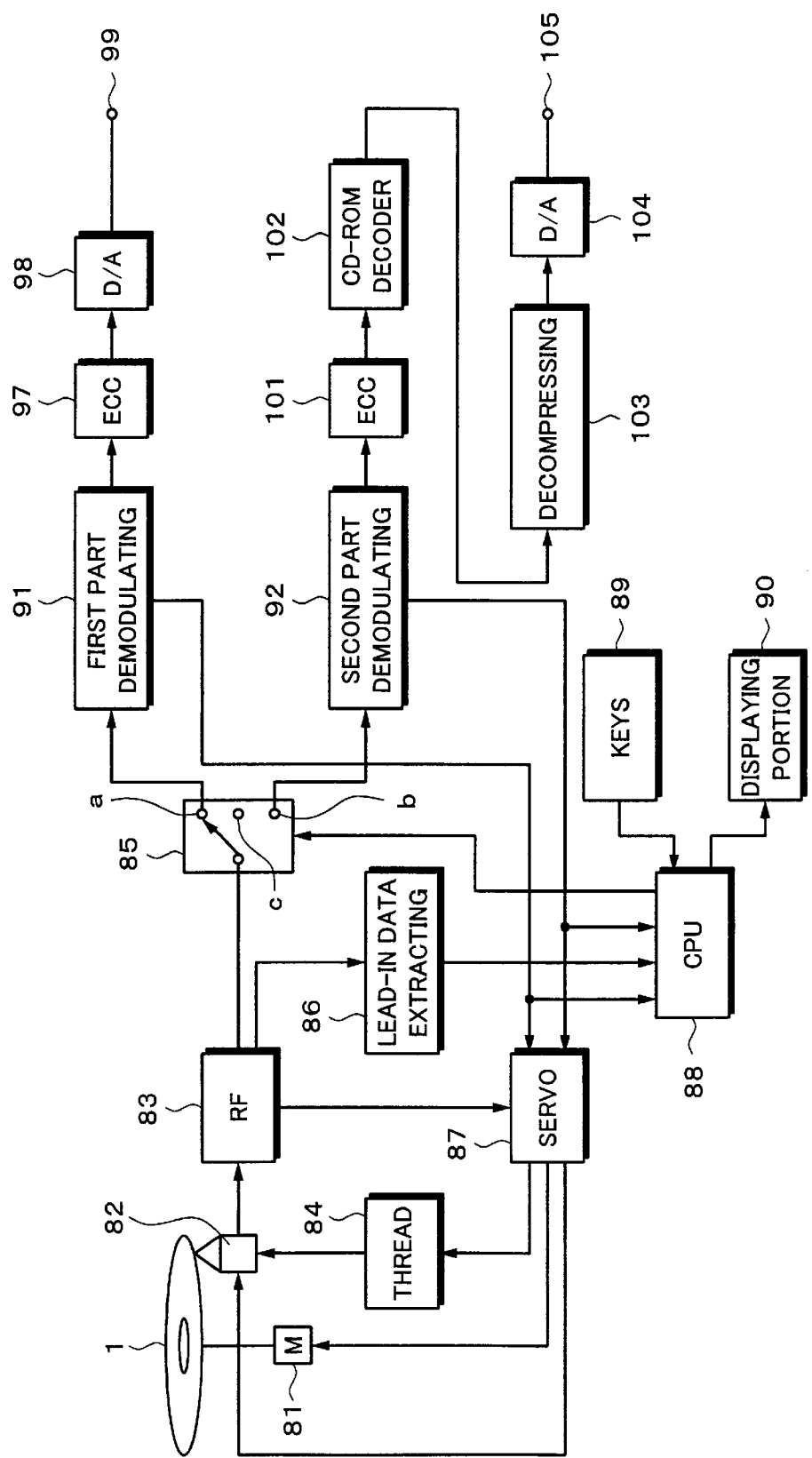
FIG. 13 is a block diagram showing the structure of a reproducing apparatus according to the embodiment of the present invention.

In FIG. 13, reference numeral 81 represents a spindle motor that rotates and drives the disc 1. Reference numeral 82 is an optical pickup that reproduces a signal recorded on the disc 1. The optical pickup 82 comprises a semiconductor laser, an optical system, a detector, and a focus and tracking mechanism. The semiconductor laser radiates laser light to the disc 1. The optical system is for example an objective lens. The detector receives the reflected light of the disc 1. The optical pickup 82 is traveled in the radius direction of the disc 1 by a thread mechanism 84.

Output signals of for example a four-divided detector of the optical pickup 82 are supplied to an RF amplifier 83. The RF amplifier 83 calculates the output signals of the detector members of the four-divided detector and generates a reproduction (RF) signal, a focus error signal, and a tracking error signal. The reproduction signal is supplied to a selector 85. Lead-in data that is read from the lead-in area LI1 is supplied to a lead-in data extracting portion 86. The focus error signal and the tracking error signal are supplied to a servo circuit 87. The servo circuit 87 controls the rotation of the spindle motor 81 corresponding to a reproduction clock of the RF signal. In addition, the servo circuit 87 controls the focus servo and tracking servo of the optical pickup 82.

The lead-in data extracting portion 86 decodes the lead-in data of the lead-in area LI1 and supplies the decoded data to a CPU 88. The CPU 88 has a function as a system controller that controls the overall operations of the reproducing apparatus. In association with the CPU 88, an operating portion 89 and a displaying portion 90 are disposed. The operating portion 89 has the same operation keys as a conventional CD reproducing apparatus. In addition, the operating portion 89 has a key or the like that designates the reproduction of the first part/second part. The CPU 88 controls the servo circuit 87 so as to control the operation of the reproducing apparatus and the access operation to the disc 1. In addition, the CPU 88 generates information displayed on the displaying portion 90 corresponding to information of sub-code.

The selector 85 is controlled by the CPU 88. The selector 85 outputs the reproduction data of the first session (LI1, PA1, and LO1) to an output terminal a. In addition, the selector 85 outputs the reproduction data of the second session (LI1, PA1, and LO1) to an output terminal b. The selector 85 selects a terminal c for a non-record portion. A first part demodulating portion 91 is connected to the output terminal a. A second part demodulating portion 92 is connected to the output terminal b.

The first part demodulating portion 91 performs the same signal process as a reproduction signal process of CD-DA. In other words, the first part demodulating portion 91 EFM-demodulates the reproduction signal, separates sub-code from the demodulated signal, and outputs sub-code. The sub-code is decoded by a decoder. The decoded sub-code (including address information) is supplied to the servo circuit 87 and the CPU 88. Data that has been EFM-demodulated is supplied to an error correcting portion 97. The error correcting portion 97 performs an error correction corresponding to CIRC. An output of the error correcting portion 97 is supplied to an D/A (Digital/Analog) converting portion 98. An analog output of the D/A converting portion 98 is extracted from an output terminal 99. An error that cannot be corrected by the error correcting portion 97 is interpolated (not shown).

The second part demodulating portion 92 performs the same signal process as the first part demodulating portion 91. Sub-code (including address information) and header information that are output from the second part demodulating portion 92 are supplied to the servo circuit 87 and the CPU 88. Data that has been EFM-demodulated is supplied to an error correcting portion 101. A CD-ROM decoder 102 is connected to the error correcting portion 101. The CDROM decoder 102 performs a disassembling process for the CD-ROM format and extracts data recorded as user data. The extracted data is supplied to a decompressing portion 103. The decompressing portion 103 decompresses the user data. An output of the decompressing portion 103 is supplied to a D/A converting portion 104. An analog signal supplied from the D/A converting portion 104 is extracted from an output terminal 105.

When encrypted data is recorded in the second part, an encrypting circuit is disposed on the recording apparatus side and a decrypting circuit is disposed on the reproducing apparatus side.

When the disc 1 is loaded, additional information recorded in the lead-in area LI1 is read to the CPU 88 by the lead-in data extracting portion 86. The user inputs predetermined data with the operating portion 89. The CPU 88 generates a signal for controlling the selector 85 with reference to the read information. Thus, data of one of the first part and the second part is selectively reproduced.

When the reproducing apparatus reproduces data of the first part PA1, the CPU 88 controls the selector 85 so that it selects the output terminal a. When the reproducing apparatus reproduces data from the second part PA2, the CPU 88 controls the selector 85 so that it selects the output terminal b.

FIG. 14 is a flow chart for explaining an outline of a reproducing operation according to the embodiment. First of all, at step S11, the disc 1 is loaded to the reproducing apparatus. Thereafter, at step S12, information recorded in the lead-in area LI1 is read to the memory of the CPU 88. In other words, both TOC that is the same as a conventional CD and additional information are read to the CPU 88. In addition, while the disc 1 is loaded to the reproducing apparatus, when the power of the reproducing apparatus is turned on, the flow advances to step S12.

At step S13, it is determined whether or not data of the first part PA1 is reproduced. For example, when the user operates the operating portion 89, the reproduction for data of the first part or the second part is designated. When the determined result at step S13 represents that the reproduction for data of the first part has been designated, the flow advances to step S14. At step S14, the reproducing operation for data of the first part is performed. The reproducing operation for data of the first part is the same as that of a conventional CD reproducing apparatus. Thus, the detail description will be omitted. At step S16, it is determined whether or not the reproducing operation has been completed. When the reproducing operation has not been completed, the flow returns to step S13. When the reproducing operation has been completed, the process is completed.

When the determined result at step S13 represents that the reproducing operation for data of the first part has not been designated, the flow advances to step S15. At step S15, the reproducing operation for data of the second part PA2 is performed. At step S16, it is determined whether or not the reproducing operation for data of the second part has been completed. When the reproducing operation has not been completed, the flow returns to step S13. When the reproducing operation has been completed, the process is completed.

The CPU 88 controls the access operation in the reproducing mode. As was described above, addresses are assigned assuming that the addresses are recorded in a non-record area. Thus, CPU 88 controls the access operation corresponding to the reproduced address. As a result, the two sections can be successively and smoothly accessed.

Since the disc 1 satisfies the CD standard, besides the reproducing apparatus according to the embodiment, the disc 1 can be reproduced by a conventional CD reproducing apparatus. However, in this case, audio data of only the first part PA1 is reproduced.

According to the embodiment, the two parts are applied for the data formats of CD and CD-ROM. However, the present invention is not limited to such an example. In other words, as data formats of the two parts, combinations of single density CD and double density CD, CD and DVD, DVD and DVD-ROM, and so forth are available.

In addition, the present invention can be applied to recordable disc-shaped record mediums such as CD-RW, CD-R, DVD-RW, and DVD-R. CD-RW is a phase change type disc of which data is recorded with laser light and data is reproduced by detecting a light amount difference. CD-R is a write once type record medium using an organic coloring matter as a record material. In addition, the present invention can be applied to a disc-shaped record medium having a recordable area and a read-only area. In the case of the recordable disc-shaped record medium, wobbled track guide grooves are formed and addresses as wobbling information are recorded. This system is referred to as ATIP. Alternatively, address areas can be discretely formed on tracks so as to record addresses. According to the present invention, any system can be used. In addition, when the present invention is applied to a data record medium other than a discshaped record medium, the same effect can be achieved.

According to the above-described embodiment, although audio contents were mainly explained, the present invention can be applied to contents of video data, still picture data, character data, computer graphic data, game software, and computer programs other than audio.

As was described above, according to the present invention, when there is a non-record portion between two record areas, since it is assumed that addresses have been assigned to the non-record portion, the access operation can be smoothly performed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data record medium in the form of an optical disc having first and second record areas and in which a non-record area of known length is formed between first and second record areas, wherein no addresses are assigned to the non-record area and addresses are assigned to the first and second record areas such that a starting address of the second record area is based on a sum of the end address of the first record area and a number based on the known length of the non-record area.

2. The data record medium as set forth in claim 1, wherein an addressing system for assigning addresses to the first record area is the same as an addressing system for assigning addresses to the second record area.

3. The data record medium as set forth in claim 1, wherein an addressing system for assigning addresses to the first record area is different from an addressing system for assigning addresses to the second record area.

4. The data record medium as set forth in claim 2,
wherein in the addressing system for assigning addresses to the first record area, each digit of minute, second, and frame is represented in BCD notation, and in the addressing system for assigning addresses to the second record area, each digit of hour, minute, second, and frame is represented in BCD notation.

5. The data record medium as set forth in claim 3,
wherein in the addressing system for assigning addresses to the first record area, each digit of minute, second, and frame is represented in BCD notation, and in the addressing system for assigning addresses to the second record area, addresses are represented in binary notation.

6. The data record medium as set forth in claim 1,
wherein a recording density of the first record area is different from a recording density of the second record area.

7. A data recording method for recording data to a record medium having a first record area and a second record area with a non-record area of a predetermined length formed therebetween, the method comprising the steps of:

assigning no addresses to the non-record area; and assigning addresses to the first and second record areas that a starting address of the second record area is derived from a sum of the end address of the first record area and a number based on the predetermined length of the non-record area.

8. A data recording apparatus for recording data to a record medium having a first record area and a second record area with a non-record area of a predetermined length formed therebetween, comprising:

an area selecting unit for selecting an area of the record medium for recording; and means for assigning addresses to the first and second record areas such that a starting address of the second record area is derived from a sum of the end address of the first record area and a number based on the predetermined length of the non-record area.

9. An accessing method for accessing a data record medium having at least two record areas and a non-record area formed therebetween, addresses being successively assigned to the record areas, comprising the steps of:

converting the length of the non-record area into the variation amount of an address; and accessing a desired position corresponding to the converted address.

10. An accessing apparatus for accessing a data record medium having at least two record areas and a non-record area formed therebetween, addressed being successively assigned to the record areas, comprising:

means for converting the length of the non-record area into the variation amount of an address and generating addresses; and means for accessing a desired position of the data record medium corresponding to the generated addresses.

* * * * *